United States Patent
Kim et al.

[11] Patent Number: 5,953,328
[45] Date of Patent: Sep. 14, 1999

[54] MEDIUM ACCESS CONTROL PROTOCOL AND METHOD FOR WIRELESS ATM NETWORKS

[75] Inventors: Yong-Jin Kim; Jang-Kyung Kim, both of Daejeon, Rep. of Korea

[73] Assignee: Electronics and Telecommunications Research Institute, Daejeon, Rep. of Korea

[21] Appl. No.: 08/851,722

[22] Filed: May 5, 1997

[30] Foreign Application Priority Data

Dec. 2, 1996 [KR] Rep. of Korea ............... 96-61021

[51] Int. Cl.[6] ................... H04B 7/212; H04L 12/28
[52] U.S. Cl. ................... 370/337; 370/347; 370/395
[58] Field of Search .................... 370/338, 401, 370/410, 337, 347, 395, 329, 321, 326, 316, 349, 322, 348

[56] References Cited

U.S. PATENT DOCUMENTS

| | | | |
|---|---|---|---|
| 5,570,355 | 10/1996 | Dail et al. | 370/395 |
| 5,638,371 | 6/1997 | Raychaudhuri et al. | 370/349 |
| 5,659,544 | 8/1997 | La Porta et al. | 370/338 |
| 5,684,791 | 11/1997 | Raychaudhuri et al. | 370/349 |
| 5,699,355 | 12/1997 | Natarajan | 370/322 |
| 5,737,328 | 4/1998 | Norman et al. | 370/338 |

FOREIGN PATENT DOCUMENTS 0 621 708 A2  10/1994  European Pat. Off. .
WO 94/17606  8/1994  WIPO .

OTHER PUBLICATIONS

Weihua Zhuang, "Medium Access Control Protocol for Multimedia Wireless Networks", 1995 IEEE, pp. 1094–1098.

Dipankar Raychaudhuri et al., "ATM–Based Transport Architecture for Multiservices Wireless Personal Communication Networks", IEEE journal on Selected Areas in Communications, vol. 12, No. 8, Oct. 1989, pp. 1401–1414.

D.J. Goodman et al., "Packet Reservation Multiple Access for Local Wireless Communications", IEEE Transactions on Communications, vol. 37, No. 8, Aug. 1989, pp. 885–890.

*Primary Examiner*—Chau Nguyen
*Assistant Examiner*—Phuongchau Ba Nguyen
*Attorney, Agent, or Firm*—Jacobson, Price, Holman & Stern, PLLC

[57] ABSTRACT

A medium access control protocol for wireless ATM network in communication protocol for controlling an access between a plurality of mobile terminals and an access control station in the wireless ATM system is provided, including: an up-stream frame for controlling a medium access by enabling the plurality of mobile terminals to transmit connection control data and status data of the terminal; and a down-stream frame for controlling the medium access by enabling the access control station receiving the up-stream frame to transmit the slot allocation data and the connection control data to the mobile terminals.

10 Claims, 8 Drawing Sheets

MEDIUM ACCESS CONTROL PROTOCOL AND METHOD FOR WIRELESS ATM NETWORKS

BACKGROUND OF THE INVENTION

1. Field of the Invention

The present invention relates to a medium access control protocol for and method for wireless ATM networks, and in particular, such a medium access control method accommodates a superior grade of service to a plurality of mobile terminals having variable traffic characteristics through a common radio channel, so that such a channel can be efficiently used for the wireless ATM networks. Moreover, the invention contrives a method of allocating a radio channel to the plurality of mobile terminals in order to extend the ATM service to the wireless area and, therefore, provide the broadband wireless multi-media service.

2. Discussion of Related Art

Recently, many studies on a media access control method have been done for the purpose of using the common media efficiently in the conventional networks. In accordance with this, PCT/US. Patent publication No. 94/00996, entitled "Medium access control protocol for wireless networks", filed on Jan. 27, 1994, introduces a multi-cell packet method for controlling a transmission chance as well as the transmission period. In addition, the conventional patent application relates to the remote communicators for transmitting the identical traffic.

For another example, "An adaptive medium access control scheme for wireless LAN" EP No. 0 621 708 A2 provides a medium access protocol method utilized for wireless radio access for a plurality of remote stations to a base station on a LAN. The MAC protocol utilizes a reservation scheme for user data traffic, and a random access method for its control and signal data. And a method for varying an up-stream, down-stream and control transmission timing band in a communication period.

But, as the conventional medium access control methods utilized in the ATM networks are not the centralized control method, the methods have the problems in guaranteeing the service qualification of the real time traffic, and supporting the variable speed. Moreover, as the contention method is used for guaranteeing the slot, the time limitation with respect to the slot allocation is not guaranteed. Therefore, the conventional technique cannot be applied to the wireless ATM networks requiring a superior grade of service and various traffics.

SUMMARY OF THE INVENTION

Accordingly, the present invention is directed to a medium access control protocol for wireless ATM networks that substantially obviates one or more of the problems due to limitations and disadvantages of the related art.

The present invention provides a medium access control protocol which enables the wireless ATM communication networks to maintain the good service quality and ATM service which permits a plurality of mobile terminals to commonly have the restricted wireless resources, so that many resources can be efficiently used and the quality of the services are controlled by the medium access control technique.

An object of the invention is to efficiently support a constant bit rate traffic and data service of various speed provided from the ATM networks by using a centralized control technique and the dynamic slot allocation technique by the access control station in order to guarantee the quality of the service and efficiently use the resources.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a medium access control protocol for wireless ATM networks in communication protocol for controlling an access between a plurality of mobile terminals and an access control station in the wireless ATM system includes an up-stream frame for controlling a medium access by enabling the plurality of mobile terminals to transmit connection control data and status data of the terminal; and a down-stream frame for controlling the medium access by enabling the access control station receiving the up-stream frame to transmit the slot allocation data and the connection control data to the mobile terminals.

For a preferred example of the up-stream frame includes a frame header having a frame identifier item; a message slot for transmitting a data packet; a status data slot for transmitting a status data packet indicating if the transmission data are in each mobile terminal; a connection control slot for transmitting a connection request packet for requesting a new connection with respect to a network through the access control station, a release request packet for ending the connection after ending the service, a connection check packet for responding to the connection request, and a release check packet; and a frame trailer.

The down-stream frame of the invention includes a frame header having a frame identifier item; a message slot for transmitting a data packet; an allocation control slot for allocating slot to the corresponding terminal capable of using the message slot in the up-stream frame through the slot allocation packet; a connection control slot for transmitting the connection requesting/check packets and the release requesting/check packets; and a frame trailer.

A method of controlling a medium access for wireless ATM network between a plurality of mobile terminals and an access control station in a wireless ATM system by using the up/down-stream frames includes (1) a connection control step of connecting the plurality of mobile terminals to the access control station through the up-stream frame; (2) a data transmission step of making the access control station to transmit the slot allocation data dynamically varied to each mobile terminal in every down-stream frame according to the status data if the status data of each mobile terminal are transmitted by the connection, and making the mobile terminal transmit the message to the access control station through the up-stream frame according to the allocated data; and (3) a connection release step of standing by for a predetermined period of time according to the connection release request of the mobile terminal and releasing the connection by examining the traffic characteristic by the access control station.

The connection control step includes the steps of (1) requesting the connection to the access control station by the mobile terminal; (2) awaiting whether to permit the connection request by the mobile terminal after operating a timer; and (3) determining if to permit the connection in relation to the connection permission control function by the access control station receiving the connection request, and then notifying its result.

The data transmitting step includes the steps of (1) notifying if the transmission data exist by using the status data packet of the status data slot allocated to itself in the up-stream frame by the mobile terminal; (2) allocating the message slot for the next frame to the constant bit rate traffic terminal and the corresponding data terminal by using the dynamic slot allocation algorithm by the access control station receiving the up-stream frame, and notifying its result by using the slot allocation packet of the allocation control slot in the down-stream frame; and (3) transmitting the message data by using the up-stream frame according to the slot allocation packet data by each terminal receiving the down-stream frame and notifying if the transmission data exist through the status data packet in the up-stream frame by the data terminal.

The dynamic slot allocation algorithm includes the steps of (1) allocating the slot to the constant bit rate traffic terminal with the constant bit rate traffic data table by the access control station; and (2) allocating the rest slot to the operational data terminal by examining the status data of the up-stream frame in the round-robin method.

The connection release step is performed by renewing the data table in case the traffic characteristic is the constant bit rate traffic, and collecting the status slot with respect to the corresponding terminal in case it is the data traffic.

The thus-structured present invention ensures an equity of the channel access between the cell delay variable channels in case of supporting the real time traffic from the ATM networks by a single-cell packet technique for transmitting a cell to a slot. In addition, as the invention re-allocates the slot to each terminal of every frame in order to realize the real time traffic of the variable speed, the currently used slot of each frame is not fixed, and the number of the slot is variable.

The present invention provides a medium access control protocol which enables the wireless ATM communication networks to maintain the good service quality and ATM service which permits a plurality of mobile terminals to commonly have the restricted wireless resources, so that many resources can be efficiently used and the quality of the services are controlled by the medium access control technique.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 1:
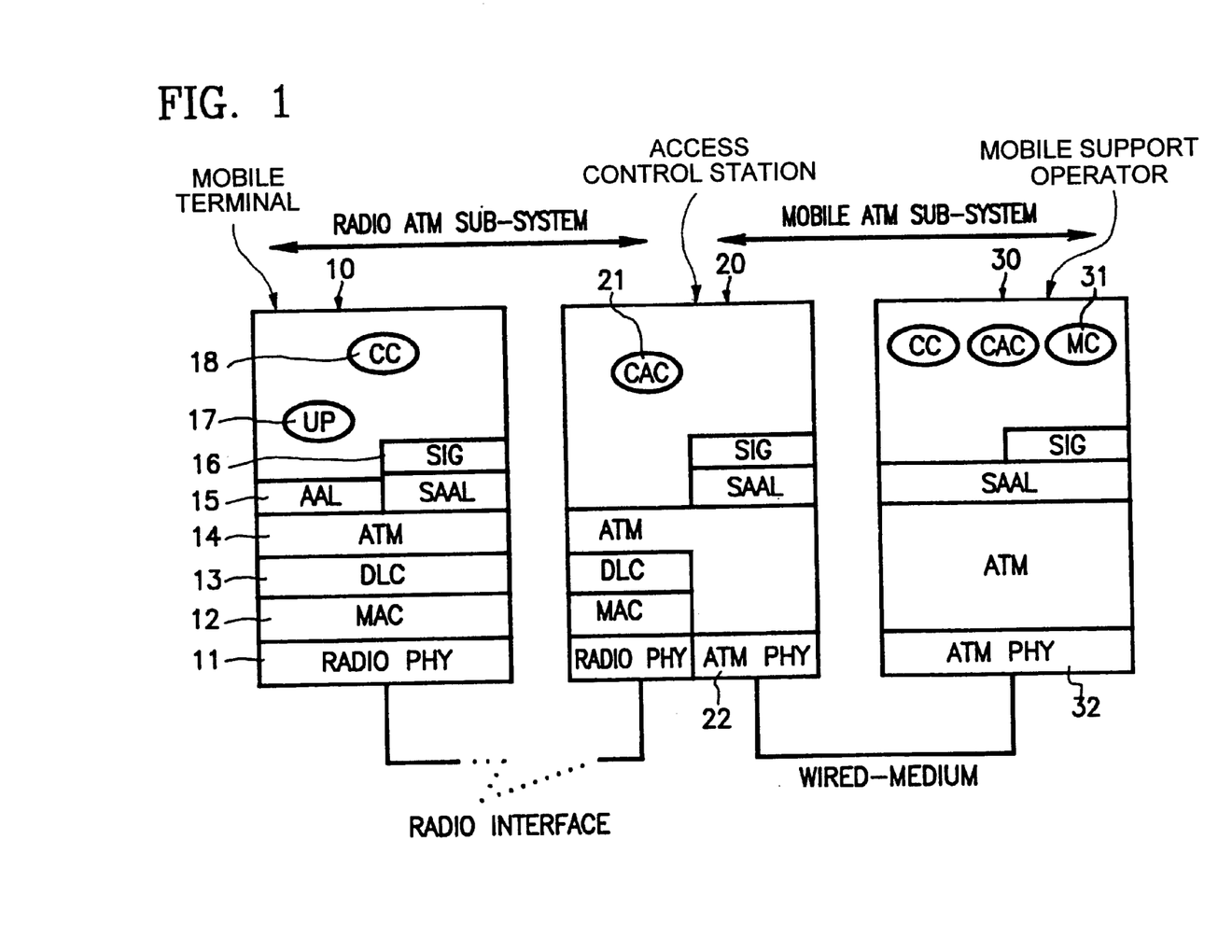
FIG. 1 is a block diagram of a wireless ATM system and protocol of the invention.

As illustrated in FIG. 1, the wireless ATM system has a radio ATM sub-system for extending a virtual channel of wired ATM network to wireless area, and a mobile ATM sub-system for supporting a mobility of the terminal. Here, the radio ATM sub-system requires a medium access control function and a data link control protocol function, and the mobile ATM sub-system requires the mobility management function.

The wireless ATM system specifically includes a plurality of mobile terminals 10, an access control station 20, and a mobile support ATM operator 30. Here, as illustrated in FIG. 1, the radio ATM sub-system is a portion where the plurality of mobile terminals 10 communicate with the access control station 20 through the radio interface. In addition, the mobile ATM sub-system is a portion where the mobile support operator 30 communicates with the access control station 20 through a wired medium.

The protocol structure of the mobile terminal 10 includes a radio PHY 11, a medium access control (MAC) 12, a data link control (DLC) 13, ATM 14, an ATM adaptation layer (AAL) 15, a signaling AAL (SAAL) 16, a user process (UP) 17, and a call control (CC) 18.

The access control station 20 has almost the same structure as the protocol of the mobile terminal. Station 20 has a connection admission control (CAC) 21 instead of UP 17 and CC 21, and additionally has an ATM physical layer protocol (ATM PHY) 22 for communicating with the ATM physical layer protocol (ATM PHY) 32 of the ATM operator 30. Here, a reference of the part having the same name as the mobile terminal will be omitted.

The thus-structured radio ATM sub-system including the mobile terminal 10 and the access control station 20 requires the medium access control layer protocol MAC 12 in order to ensure the superior grade of service and efficiently use the radio resources, thereby supporting ATM service to the plurality of mobile terminals using the radio channel having a low reliability. Moreover, ATM PHY, ATM, SAAL, SIG, CC, CAC, and a mobility control (MC) 31 are structured in the mobility supporting ATM operator 30 in order to support the mobility of the terminal. In the ATM operator 30, reference numbers are not assigned to the same components as those of the mobile terminal 10.

The invention provides the medium access control function scheme and its protocol used in the radio ATM sub-system.

Figure 2:
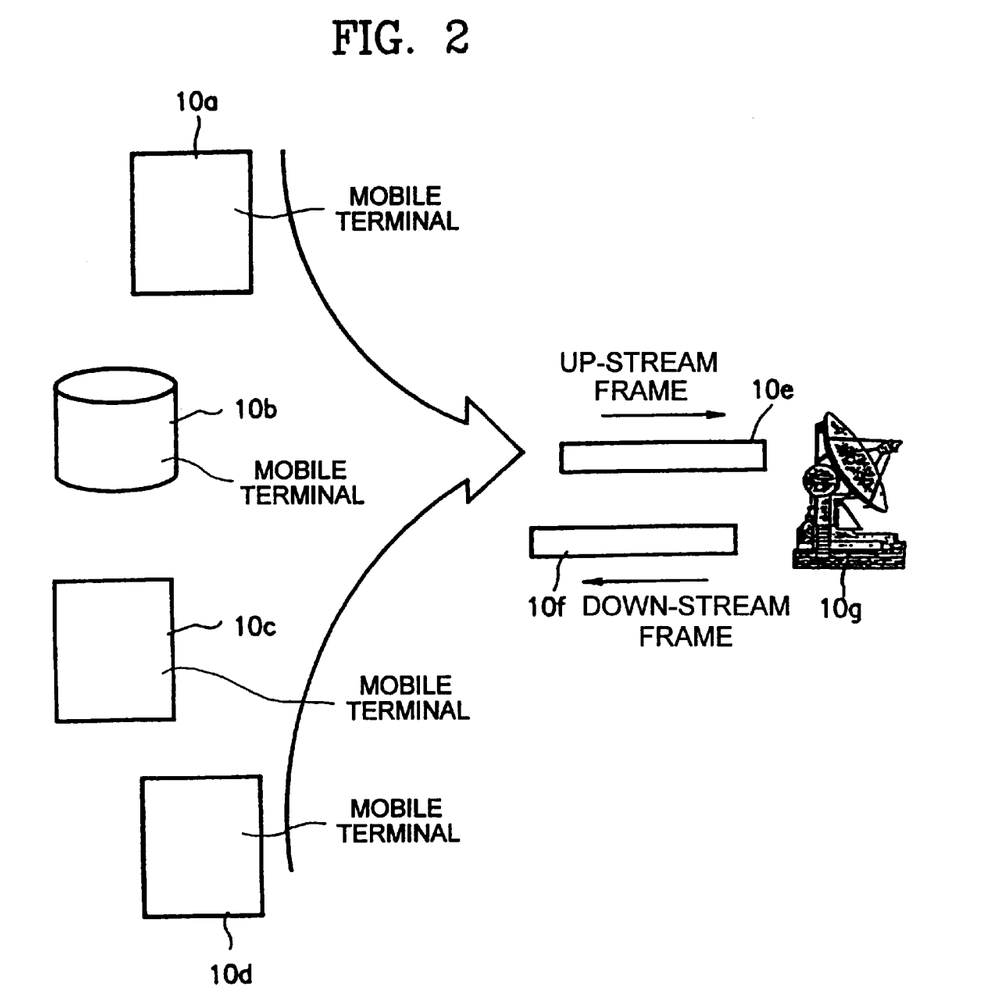
FIG. 2 illustrates a topology of a radio ATM sub-system for a medium access control.

FIG. 2 illustrates the mobile terminals 10a to 10d forming the radio ATM sub-system, and a star-shaped topology of the access control station. FIG. 2 also defines the up-stream frame 10e and down-stream frame 10f exchanged between the mobile terminal 10 and the access control station 20 through the radio interface. The up-stream frame 10e is formed for performing the medium access control by transmitting the connection control data and the status data of the terminal to the access control station 10g by the plurality of mobile terminals 10a to 10d.

Figure 3A:
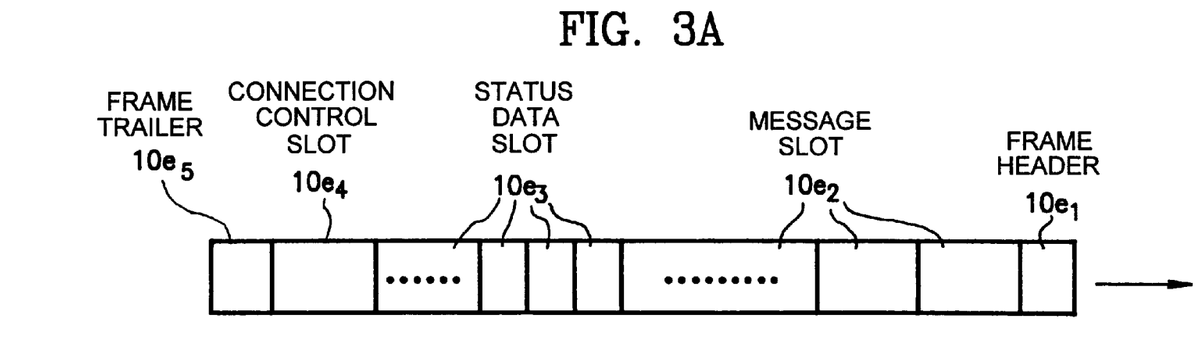
FIGS. 3A and 3B illustrate the structures of the frames for the medium access control.
Figure 3B:
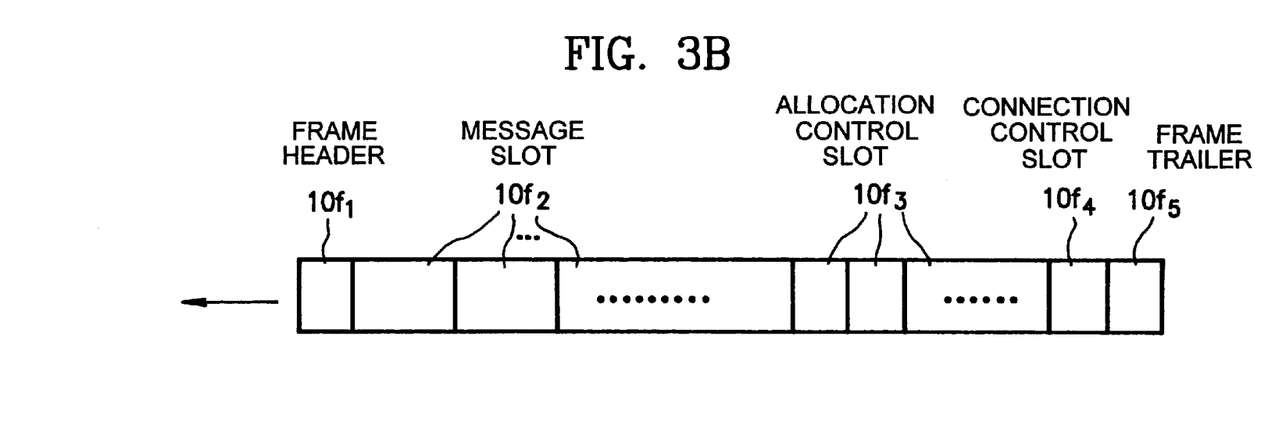

FIGS. 3A and 3B illustrate the structures of the up/downstream frames, and the operation will be described with reference to FIGS. 4A to 4F. FIGS. 4A to 4F illustrate the structure of the control slot of each frame for the medium access control.

As illustrated in FIG. 3A, the up-stream frame 10e has a frame header 10e1, a message slot 10e2, a status data slot 10e3, a connection control slot 10e4, and a frame trailer 10e5. Here, the frame header 10e1 has its frame identifier item. The message slot 10e2 is used for transmitting the status data packet (refer to FIG. 4E) from the mobile terminals to the access control station. The connection control slot 10e4 transmits a connection request packet (refer to FIG. 4A) used when the mobile terminal requests a new connection with the network through the access control station. The connection control slot 10e4 also transmits a release request packet (refer to FIG. 4C) used for the connection end after the service end, a connection check packet (refer to FIG. 4B) and a release check packet (FIG. 4D) for providing the responses to the requests. The status data slot 10e3 is used for transmitting the status data packet (refer to FIG. 4E) notifying if the data of each data terminal is transmitted.

The down-stream frame 10f has a frame header 10f1, a message slot 10f2, an allocation control slot 10f3, a connection control slot 10f4, and a frame trailer 10f5. Here, the frame header 10f1 has its frame identifier item. The message slot 10f2 is used for transmitting the data packet from the access control station to the mobile terminal. The allocation control slot 10f3 is used for allocating each terminal to the corresponding message slot 10e2 in the up-stream frame 10e by the access control station. The connection control slot 10f4 is used for transmitting the connection request/check packets (refer FIGS. 4A and 4B) and the release request/check packets (FIGS. 4C and 4D). If the numbers of the data slot in a frame and the status data slot are respectively L and N, the numbers of the allocation control slot and the maximum data terminal are respectively L and N.

Figure 4A:
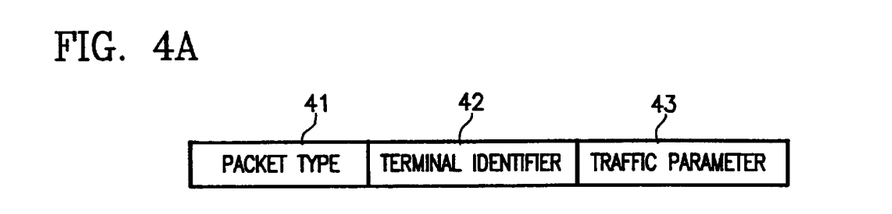
FIGS. 4A to 4F illustrate a structure of the control slot of the medium access control.
Figure 4B:
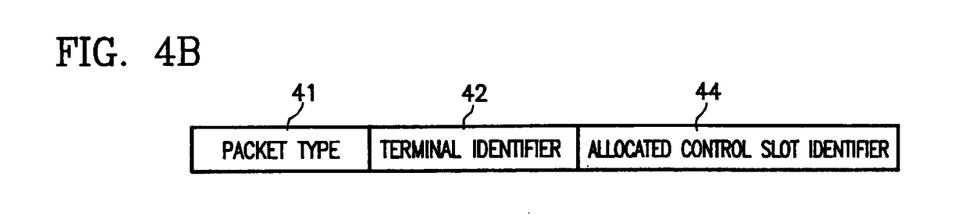
Figure 4C:
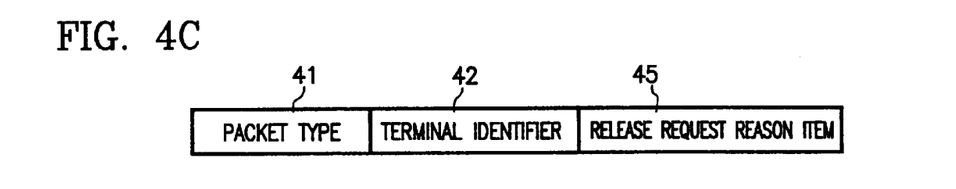
Figure 4D:
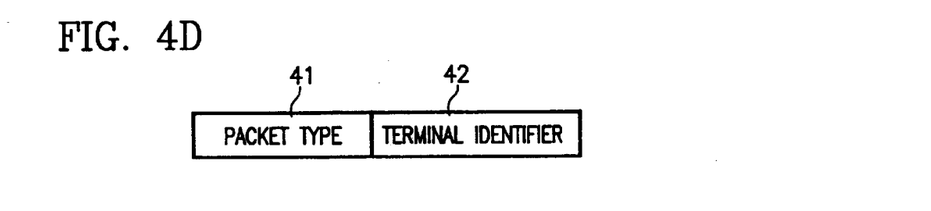
Figure 4E:
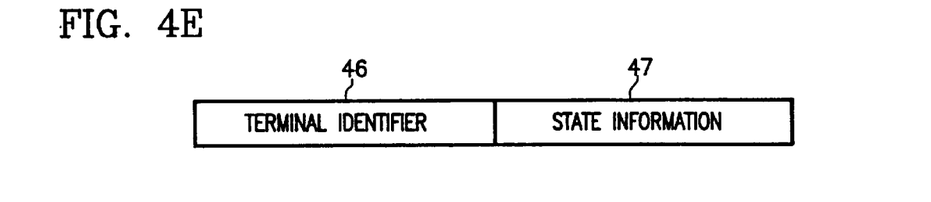
Figure 4F:
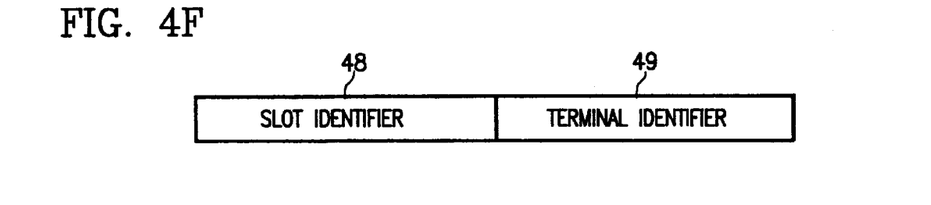

FIGS. 4A to 4F illustrate the structure of each control packet such as the connection request packet (FIG. 4A), the connection check packet (FIG. 4B), the status data packet (FIG. 4E) and the slot allocation packet (FIG. 4F). The connection request packet (refer to FIG. 4A) made up with a packet type item 41, that is the connection request packet, a terminal identifier item for requesting the connection 42, and a traffic parameter item of the terminal 43, is used in requesting the new connection. The connection check packet of FIG. 4B is the check with respect to the connection request, and includes the packet type item 41, a terminal identifier item for requesting the connection 42, and an identifier of the status data slot to be used for the terminal. The status data packet (FIG. 4E) is used only by the data terminal, so that the item is defined as "NULL" in case the terminal is for the constant bit rate traffic, and the item defines all bit values as "1" in case the connection fails. The release request packet (FIG. 4C) is used for requesting to release the connection, and made up with the packet type item 41, a terminal identifier item for requesting the connection 42, and the terminal identifier reason item 45. The release check packet (refer to FIG. 4D) is made up with the packet type item 41 and the terminal identifier item 42 and used for the response to the release request. The status data packet (FIG. 4E) is made up with the terminal identifier item 46 and the status data item 47 indicating if the transmission data are in the terminal. The slot allocation packet (FIG. 4F) is made up with the slot identifier item 48 and the terminal identifier item 49, and indicates which data slot should be allocated to the corresponding terminal.

Figure 5:
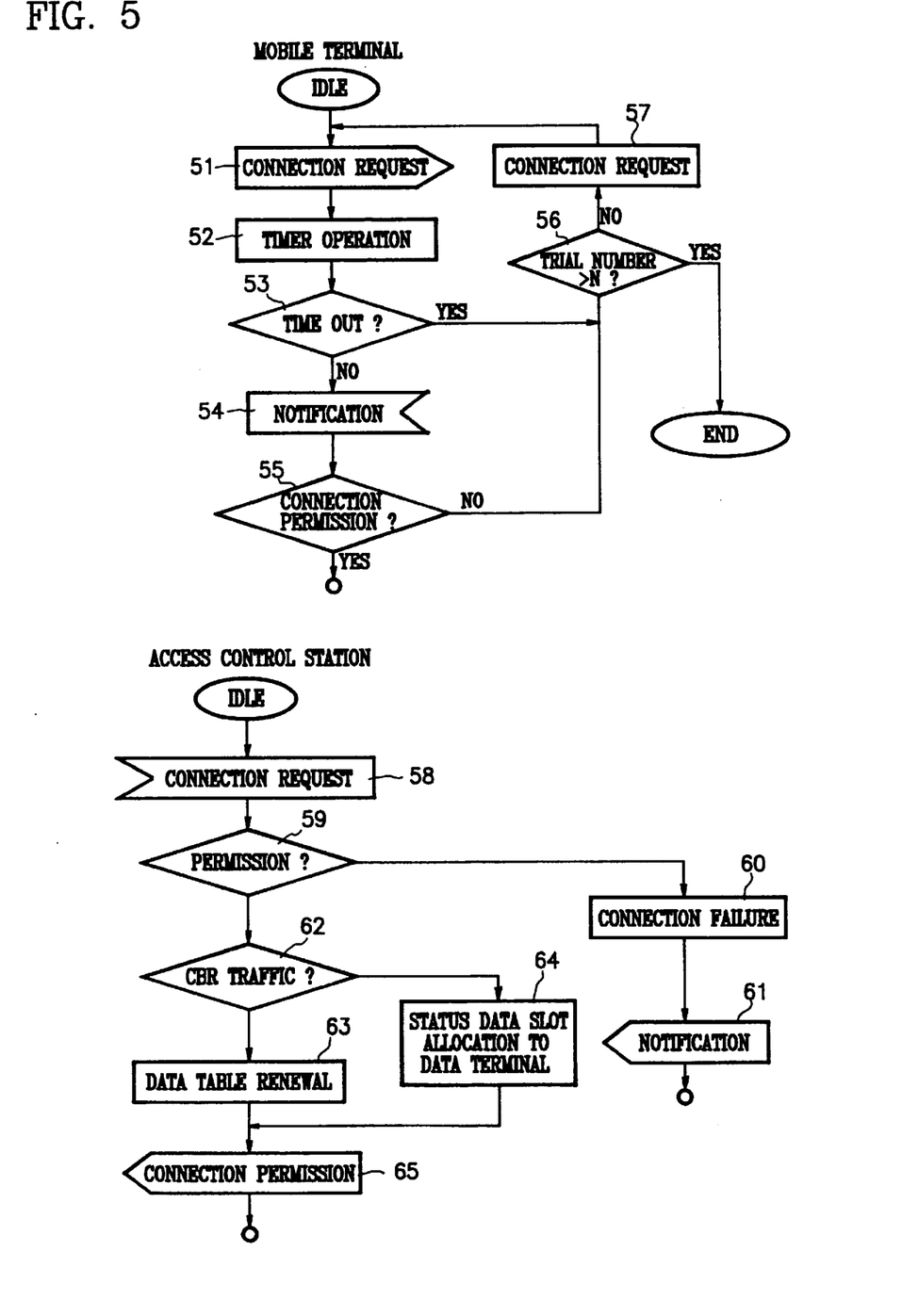
FIG. 5 is a flow chart showing the connection control logic of the protocol for a wireless ATM medium access control.
Figure 6:
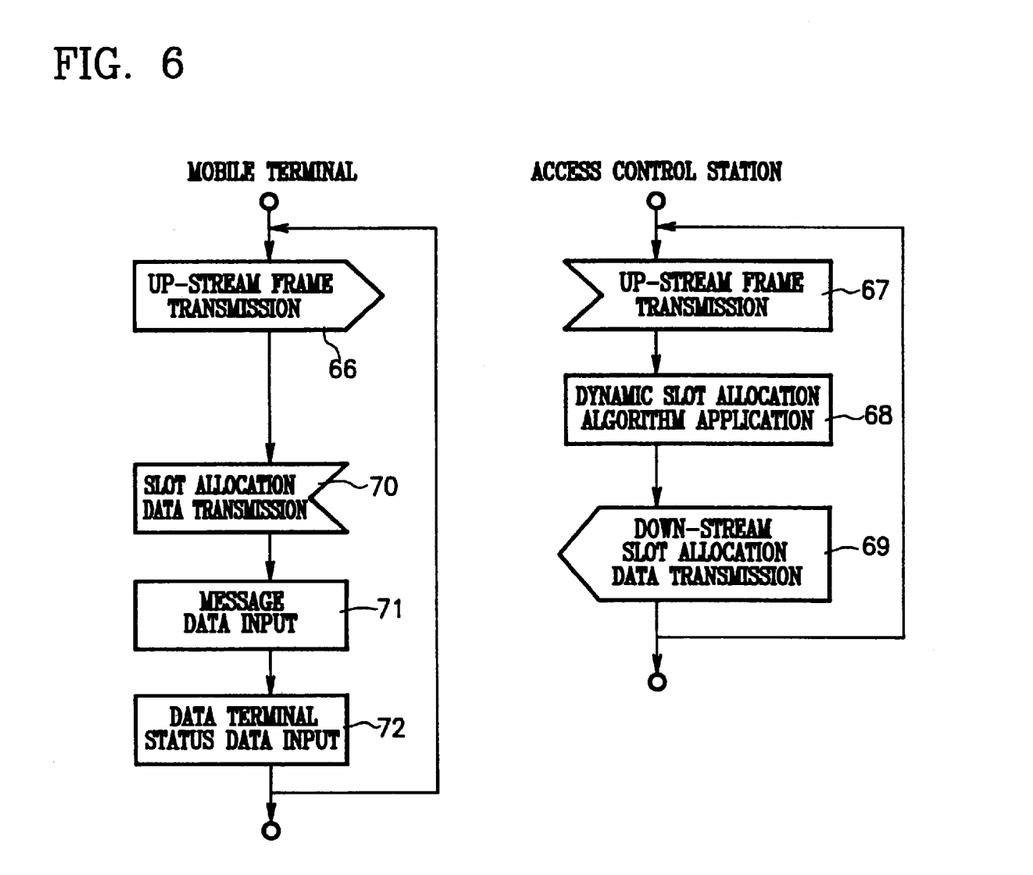
FIG. 6 is a flow chart showing the data transmission logic of the protocol for a wireless ATM medium access control.
Figure 7:
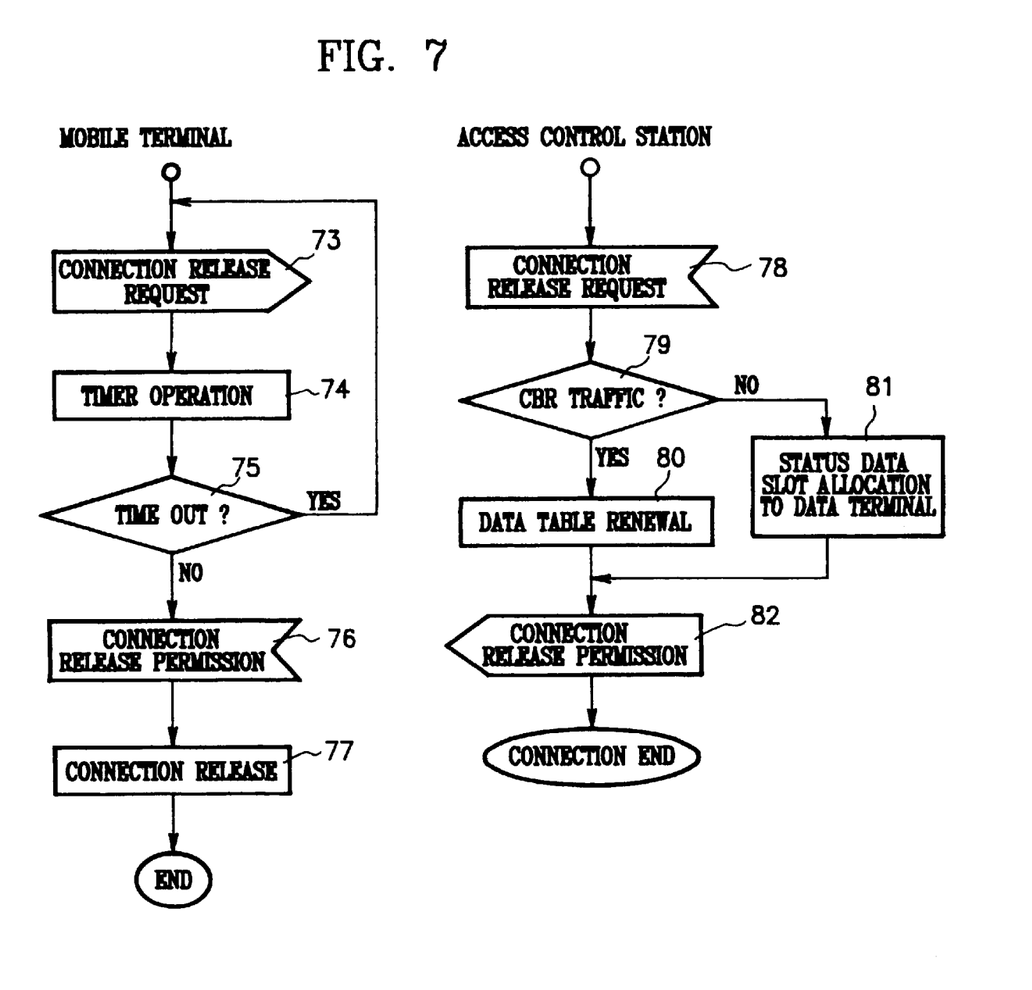
FIG. 7 is a flow chart showing the connection release logic of the protocol for a wireless ATM medium access control.

FIGS. 5 to 7 are flow charts illustrating the wireless ATM medium access control method of the invention.

FIG. 5 illustrates the connection controlling procedure of the protocol flow for the wireless ATM medium access control. That is, the connection request is transmitted from the mobile terminal to the access control station in step 51. For this, the connection request packet is loaded on the connection control slot of the up-stream frame. And then, the mobile terminal waits for the permission of the connection request after operating a timer in step 52. Here, when the time is out in step 53 or the response of the failure with respect to the connection request is transmitted in steps 54 and 55, the above-operation is tried again by n times in step 56 with the operation of the timer in step 57. And, when the retrial fails by n times, the connection request is ended. Thereafter, the access control station which received the connection request in step 58 determines whether to admit the connection in relation to the connection permission control function in step 59, and notifies of its result. Here, if the terminal requesting the connection is the constant bit rate traffic terminal in step 62, the corresponding items such as the terminal identifier or the traffic parameter are added to the data table. When the connection request terminal is the data terminal in step 63, the status data slot is allocated in step 64. If the access control station does not permit the connection, the connection failure is notified to the mobile terminal. The mobile terminal receiving the connection receipt notification transmits the data by the control of the access control station.

FIG. 6 illustrates the data transmission procedure of the protocol flow for the wireless ATM medium access control. The data traffic terminal of the mobile terminals indicates if the transmission data exist by using the status data packet to the status data slot allocated to the up-stream frame in step 66. The access control station receiving the up-stream frame in step 67 allocates the message slot for the next frame to the constant bit rate traffic terminal and the corresponding data terminal by applying the dynamic slot allocation algorithm in step 68. And then, the allocated slot is notified to the allocation control slot of the down-stream frame by using the slot allocation packet in step 69. Accordingly, each terminal receiving the down-stream frame in step 70 transmits the message data to the up-stream frame according to the slot allocation packet data of the allocation control slot in step 71, and the data terminal indicates the current status data notifying if the transmission data exist, through the status data packet in the up-stream frame in step 72.

FIG. 7 illustrates the connection release procedure of the protocol flow for the wireless ATM medium access control. The mobile terminal for the connection release loads the release request packet on the connection control slot in the up-stream frame in step 73. After the request, the timer is operated in step 74. If the response arrives, the connection is released in steps 76 and 77. If the time is out before the response arrives, the connection release request is repeated until the response is received in step 75. The access control station receiving the connection release request 73 transmits the connection release check packet in step 82. Here, the traffic characteristic is examined in step 79 and the data table is renewed in case the traffic is the constant bit rate traffic, that is, the corresponding item removed, 80. In case the traffic is the data traffic, the status slot is collected in step 81.

Figure 8:
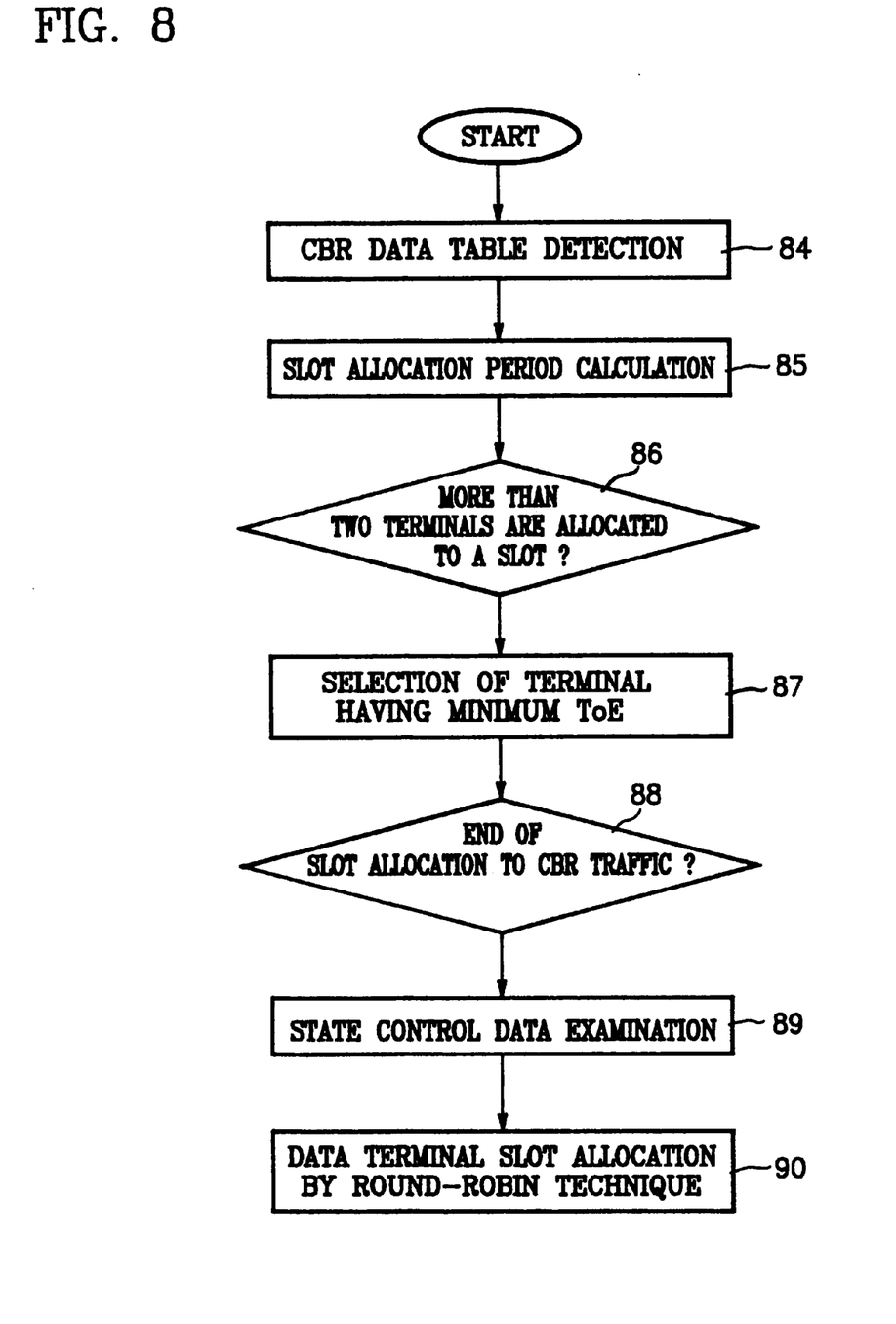
FIG. 8 is a flow chart showing the dynamic slot allocation logic determining the slot with respect to the terminals in the access control station.

FIG. 8 illustrates the dynamic slot allocation algorithm for allocating the message slot to each mobile terminal by the access control station described with reference to FIG. 6. The slot for each terminal is allocated by using the constant bit rate traffic data table. Here, the allocation period with respect to each terminal is variable. The kth slot allocation period $T_k^i$ of the terminal $i$ is the following equation (1).

$$T_k^i = \begin{cases} \left[\dfrac{C}{\lambda^i}\right] + 1 & \text{if } \dfrac{1}{k}\sum_{j=1}^{k-1} T_k^i + \left[\dfrac{C}{\lambda^i}\right] < TP^i \\ \dfrac{C}{\lambda^i} & \text{otherwise} \end{cases} \quad (1)$$

Here, C is the radio channel capacity. $\lambda^i$ is the maximum cell ratio of the $i$ traffic. $TP^i$ is the theoretical cell allocation period of the terminal $i$ traffic, and its value is given by $$\dfrac{C}{\lambda^i}.$$

Here, the unit of the time is the service time with respect to one cell. When the terminal is allocated to the slot according to the equation (1) and more than two terminals are allocated to a slot in steps 86 and 87, the time of expiry (ToE) of each terminal is defined, and the slot is allocated to the terminal whose ToE is the minimum value. And the rest terminals are allocated to the next slot in case the slot allocation with respect to the constant bit rate traffic terminal is not finished. Thereafter, the above steps 85, 86 and 87 are repeated with respect to the next slot. Here, $ToE^i$ value with respect to the constant bit rate traffic terminal $i$ is defined according to the following equation (2).

$$ToE^i = TP^i - \text{message delaying time of the terminal } i \quad (2)$$

Here, the message delaying time with respect to the terminal $i$ is the value subtracted the first slot allocation time of the corresponding message from the current time. Moreover, in order to use the connection permission control function for allocating the slot to the constant bit rate traffic, the condition "the sum of the maximum cell ratio of all constant bit rate traffic being in connection does not above the capacity of the wireless channel" should be satisfied. After ending the slot allocation to the constant bit rate traffic terminal, the status data transmitted from the up-stream frame is examined in step 89. And then, the rest slots are allocated to the data terminals which are turned on in a round-robin method in step 90. That is, the invention uses the method for permitting every traffic to use all slots of each frame to each terminal by the access control station with respect to the radio channel. The allocating order, as described above, is as follows. First, the slot is allocated to the real time period traffic of the variable speed for ensuring the quality of the service. And then, the rest band width is allocated for the data traffic. This allocation ensures the efficiency of the radio channel and the equity of the channel access between the terminals by using the round-robin method according to the status data provided from the terminal. In addition, as the invention re-allocates the slot to each terminal of every frame in order to realize the real time traffic of the variable speed, the currently used slot of each frame is not fixed, and the number of the slot is variable.

As described above, the invention is made up with the signal protocol used between the terminal and the access control station, and the dynamic slot allocation algorithm used in the access control station, so that the mobile terminals forming the wireless ATM network can efficiently use the wireless channel through the access control station. The invention is applied to the radio ATM sub-system of the wireless ATM radio system, and provides the up/down-stream frame structure for the signal protocol, and the flow chart of the protocol. Moreover, the invention provides the dynamic slot allocation algorithm used in the access control station, and the diagram of the data table for the slot allocation with respect to the constant bit rate traffic.

A method for controlling the medium access of the invention is as follows.

The access control station collects the status data of each terminal for supporting the constant bit rate traffic terminal and the data terminal. Here, the data for the constant bit rate traffic terminal is structured in the form of the table by collecting the data with respect to the maximum cell ratio of each terminal and the terminal identifier by the connection permission control function. The data for the constant bit rate traffic terminal is used until the connection is released. In collecting the status data according to the signal period by using the signal protocol, each data terminal notifies if it has the transmission data to the access control station by using the control channel. The access control station allocates the slot to the constant bit rate traffic terminal by using the dynamic slot allocation technique and allocates the rest slots to the data terminal by the round-robin method. If allocating the slot in a centralized slot allocation control method, the collision may be avoided. In addition, the limit of time with respect to the slot allocation is given to the constant bit rate traffic terminal, and the efficiency and equity are provided to the data terminal.

The wireless ATM network of the thus-operated invention can efficiently support every traffic supported by the conventional ATM network, through the wireless channel. Therefore, the services used in the ATM network can be extended to the wireless area with guaranteeing the superior grade of service.

It will be apparent to those skilled in the art that various modifications and variations can be made in the medium access control protocol for wireless ATM network of the present invention without departing from the spirit or scope of the invention. Thus, it is intended that the present invention cover the modifications and variations of this invention provided they come within the scope of the appended claims and their equivalents.

What is claimed is:

1. A method of controlling a medium access for wireless ATM network between a plurality of mobile terminals and an access control station in a wireless ATM system by using the up/down-stream frames, comprising:

(1) a connection control step of connecting the plurality of mobile terminals to the access control station through the up-stream frame;

(2) a data transmission step of making the access control station to transmit the slot allocation data dynamically varied to each mobile terminal in every down-stream frame according to the status data if the status data of each mobile terminal are transmitted by the connection, and making the mobile terminal transmit the message to the access control station through the up-stream frame according to the allocated data; and (3) a connection release step of standing by for a predetermined period of time according to the connection release request of the mobile terminal and releasing the connection by examining the traffic characteristic by the access control station.

2. The method of controlling a medium access for wireless ATM network as claimed in claim 1, wherein the connection control step comprises the steps of:

(1) requesting the connection to the access control station by the mobile terminal;

(2) awaiting whether to permit the connection request by the mobile terminal after operating a timer; and (3) determining if to permit the connection in relation to the connection permission control function by the access control station receiving the connection request, and then notifying its result.

3. The method as claimed in claim 2, wherein the step (1) is performed in a manner that the connection request packet is loaded on the connection control slot of the up-stream frame.

4. The method as claimed in claim 2, wherein the step (2) is performed through a predetermined number of retrial in case the timer is time-out or a response with respect to the connection request indicating its failure is transmitted from the access control station.

5. The method as claimed in claim 2, wherein the step (3) is performed by renewing the data table in case the mobile terminal requesting the connection is a constant bit rate traffic terminal, and allocating the status data slot in case the terminal requesting the connection is the data terminal.

6. The method as claimed in claim 1, wherein the data transmission step comprises the steps of:

(1) notifying if the transmission data exist by using the status data packet of the status data slot allocated to itself in the up-stream frame by the mobile terminal;

(2) allocating the message slot for the next frame to the constant bit rate traffic terminal and the corresponding data terminal by using the dynamic slot allocation algorithm by the access control station receiving the up-stream frame, and notifying its result by using the slot allocation packet of the allocation control slot in the down-stream frame; and (3) transmitting the message data by using the up-stream frame according to the slot allocation packet data by each terminal receiving the down-stream frame and notifying if the transmission data exist through the status data packet in the up-stream frame by the data terminal.

7. The method as claimed in claim 6, wherein the dynamic slot allocation algorithm comprises the steps of:

(1) allocating the slot to the constant bit rate traffic terminal with the constant bit rate traffic data table by the access control station; and (2) allocating the rest slot to the operational data terminal by examining the status data of the up-stream frame in the round-robin method.

8. The method as claimed in claim 7, wherein the kth slot allocation period of the terminal $i$ is calculated by the following equation.

$$T_k^i = \begin{cases} \left[\dfrac{C}{\lambda^i}\right] + 1 & \text{if } \dfrac{1}{k}\sum_{j=1}^{k-1} T_k^i + \left[\dfrac{C}{\lambda^i}\right] < TP^i \\ \dfrac{C}{\lambda^i} & \text{otherwise.} \end{cases} \quad (1)$$

9. The method as claimed in claim 7, wherein the slot allocation is performed in a manner that a slot is allocated to the terminal whose time of expiry is the minimum value and the rest terminals are allocated to the next slot in case more than two terminals are allocated in a slot.

10. The method as claimed in claim 1, wherein the connection release step is performed by renewing the data table in case the traffic characteristic is the constant bit rate traffic, and collecting the status slot with respect to the corresponding terminal in case it is the data traffic.

* * * * *